(12) United States Patent
Oldani et al.

(10) Patent No.: US 11,905,746 B1
(45) Date of Patent: Feb. 20, 2024

(54) FRICTION HINGE

(71) Applicant: Microsoft Technology Licensing, LLC, Redmond, WA (US)

(72) Inventors: Michael Gordon Oldani, Redmond, WA (US); Jordan David Little, Monroe, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/154,721

(22) Filed: Jan. 13, 2023

(51) Int. Cl.
*E05D 11/08* (2006.01)
*E05D 3/02* (2006.01)

(52) U.S. Cl.
CPC .............. *E05D 11/087* (2013.01); *E05D 3/02* (2013.01)

(58) Field of Classification Search
CPC ................................ E05D 3/02; E05D 11/087
See application file for complete search history.

(56) References Cited

U.S. PATENT DOCUMENTS

| | | | | | |
|---|---|---|---|---|---|
| 4,286,353 A | * | 9/1981 | Roche | ....................... | E06C 1/32 403/81 |
| 4,756,053 A | * | 7/1988 | Madden | ..................... | F02K 1/12 16/386 |
| 4,787,731 A | * | 11/1988 | Rogers | .................. | G02C 5/001 351/153 |
| 4,974,289 A | * | 12/1990 | Piard | ..................... | G02C 5/2254 16/334 |
| 5,154,382 A | * | 10/1992 | Hoshino | ................ | F16M 11/10 248/185.1 |
| 5,940,935 A | * | 8/1999 | Julius | ....................... | E05D 1/06 403/364 |
| 6,168,345 B1 | * | 1/2001 | Legge | ...................... | E04G 7/14 403/385 |
| 6,315,154 B1 | * | 11/2001 | Newby, Sr. | ............. | E05D 5/125 220/4.23 |
| 6,499,750 B1 | * | 12/2002 | Michelau | ................ | B62B 3/007 280/87.01 |
| 6,842,923 B1 | * | 1/2005 | Castellani | .............. | A61G 1/013 16/374 |
| 7,735,198 B2 | * | 6/2010 | Petermann | ............. | F16M 11/06 16/342 |
| 8,635,743 B2 | * | 1/2014 | Smith | ................... | F16C 11/045 16/382 |
| 11,099,612 B2 | * | 8/2021 | Sanchez | .................. | E05D 11/08 |
| 11,530,561 B2 | * | 12/2022 | Oldani | .................. | E05D 11/087 |
| 11,773,635 B2 | * | 10/2023 | Lin | ........................ | E05D 5/14 16/337 |
| 2012/0124775 A1 | * | 5/2012 | Ceci | ..................... | G06F 1/1681 16/342 |

(Continued)

*Primary Examiner* — Jason W San
(74) *Attorney, Agent, or Firm* — Alleman Hall & Tuttle LLP

(57) ABSTRACT

Examples are disclosed relating to friction hinges. In one example, a friction hinge comprises a first stub and adjacent second stub extending from a stub substrate. A first finger extends from a finger substrate between the first stub and the second stub and comprises a distal contacting face that is biased into contact with a first biasing face of the first stub. A second finger adjacent to the first finger extends from the finger substrate between the first stub and the second stub and comprises a distal contacting face that is biased into contact with a second biasing face of the second stub. A pin extends through apertures in the first stub, first finger, second finger, and second stub.

21 Claims, 14 Drawing Sheets

(56) References Cited

U.S. PATENT DOCUMENTS

| | | | |
|---|---|---|---|
| 2012/0240381 A1* | 9/2012 | Carey | B21D 39/037 403/364 |
| 2019/0085885 A1* | 3/2019 | Khatib | F16B 5/0056 |
| 2021/0011524 A1 | 1/2021 | Wang et al. | |
| 2022/0065012 A1* | 3/2022 | Lin | E05D 11/1007 |

* cited by examiner

200

Positioning the stub substrate at a first angular orientation relative to the finger substrate, wherein the stub substrate comprises a first stub and an adjacent second stub extending from a stub substrate, and the finger substrate comprises a first finger extending from the finger substrate between the first stub and the second stub, the first finger comprising a distal contacting face that is biased into contact with a first biasing face of the first stub, and the finger substrate comprising a second finger adjacent to and axially spaced from the first finger and extending from the finger substrate between the first stub and the second stub, the second finger comprising a distal contacting face that is biased into contact with a second biasing face of the second stub, wherein a pin extends through a stub aperture in the first stub, a finger aperture in the first finger, a finger aperture in the second finger, and a stub aperture in the second stub 204

Repositioning the stub substrate to a second angular orientation relative to the finger substrate, wherein frictional contact between at least the distal contacting face of the first finger and the first biasing face of the first stub and between the distal contacting face of the second finger and the second biasing face of the second stub causes the stub substrate to maintain the second angular orientation relative to the finger substrate 208

Wherein the first finger comprises a distal non-contacting face opposite to its distal contacting face, and the second finger comprises a distal non-contacting face opposite to its distal contacting face, and the distal non-contacting face of the first finger and the distal non-contacting face of the second finger define an opening between the distal non-contacting face of the first finger and the distal non-contacting face of the second finger 212

Wherein the first finger and the second finger have a same shape 216

Wherein the first finger is rotated 180 degrees about its longitudinal axis relative to the second finger 220

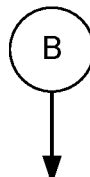

Wherein the first stub biases the distal contacting face of the first finger in a first direction, and the second stub biases the distal contacting face of the second finger in a second direction opposite to the first direction 224

Wherein the first stub deflects the first finger toward the second finger, and the second stub deflects the second finger toward the first finger 228

Wherein the first stub deflects the first finger from a first pre-assembly position to a first post-assembly position that causes the distal contacting face of the first finger to exert an axial force in a second direction on the first biasing face of the first stub, and the second stub deflects the second finger from a second pre-assembly position to a second post-assembly position that causes the distal contacting face of the second finger to exert an axial force in a first direction opposite to the second direction on the second biasing face of the second stub 232

```
┌─────────────────────────────────────────────────────────────────────┐
│ Providing a stub substrate comprising a first stub and an adjacent  │
│ second stub extending from the stub substrate 304                   │
└─────────────────────────────────────────────────────────────────────┘
                                   ↓
┌─────────────────────────────────────────────────────────────────────┐
│ Providing a finger substrate comprising a first finger and an       │
│ adjacent second finger extending from the finger substrate, the     │
│ first finger comprising a distal contacting face and a ramping      │
│ surface between its distal contacting face and the finger substrate,│
│ and the second finger comprising a distal contacting face and a     │
│ ramping surface between its distal contacting face and the finger   │
│ substrate 308                                                       │
└─────────────────────────────────────────────────────────────────────┘
                                   ↓
┌─────────────────────────────────────────────────────────────────────┐
│ Inserting the first stub at a base of the ramping surface of the    │
│ first finger and the second stub at a base of the ramping surface   │
│ of the second finger 312                                            │
└─────────────────────────────────────────────────────────────────────┘
                                   ↓
┌─────────────────────────────────────────────────────────────────────┐
│ Sliding the first stub along the ramping surface of the first       │
│ finger to its distal contacting face and the second stub along the  │
│ ramping surface of the second finger to its distal contacting face, │
│ thereby biasing the first finger's distal contacting face against   │
│ the first stub and the second finger's distal contacting face       │
│ against the second stub 316                                         │
└─────────────────────────────────────────────────────────────────────┘
                                   ↓
┌─────────────────────────────────────────────────────────────────────┐
│ Aligning a first stub aperture in the first stub, a first finger    │
│ aperture in the first finger, a second finger aperture in the       │
│ second finger, and a second stub aperture in the second stub 320    │
└─────────────────────────────────────────────────────────────────────┘
                                   ↓
┌─────────────────────────────────────────────────────────────────────┐
│ Inserting a pin through the first stub aperture, the first finger   │
│ aperture, the second finger aperture, and the second stub aperture  │
│ 324                                                                 │
└─────────────────────────────────────────────────────────────────────┘
```

FIG. 15

FRICTION HINGE

BACKGROUND

Some devices include one or more hinges that rotatably couple two substrates for relative movement.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to friction hinges for rotatably coupling two substrates and methods for assembling friction hinges. In one example, a friction hinge comprises a first stub and an adjacent second stub extending from a stub substrate. A first finger extends from a finger substrate between the first stub and the second stub. The first finger comprises a distal contacting face that is biased into contact with a first biasing face of the first stub. A second finger adjacent to the first finger also extends from the finger substrate between the first stub and the second stub. The second finger comprises a distal contacting face that is biased into contact with a second biasing face of the second stub. A pin extends through apertures in the first stub, first finger, second finger, and second stub.

In another example, a computing device comprises a first substrate and a second substrate that is moveably coupled to the first substrate via a friction hinge. The friction hinge comprises a first stub and an adjacent second stub extending from a stub substrate. A first finger extends from a finger substrate between the first stub and the second stub. The first finger comprises a distal contacting face that is biased into contact with a first biasing face of the first stub. A second finger adjacent to the first finger also extends from the finger substrate between the first stub and the second stub. The second finger comprises a distal contacting face that is biased into contact with a second biasing face of the second stub. A pin extends through apertures in the first stub, first finger, second finger, and second stub.

In another example, a method of operating a friction hinge comprising a stub substrate rotatably coupled to a finger substrate includes positioning the stub substrate at a first angular orientation relative to the finger substrate, wherein the stub substrate comprises a first stub and an adjacent second stub extending from a stub substrate, and the finger substrate comprises a first finger extending from the finger substrate between the first stub and the second stub. The first finger comprises a distal contacting face that is biased into contact with a first biasing face of the first stub. The finger substrate also comprises a second finger adjacent to and axially spaced from the first finger and extending from the finger substrate between the first stub and the second stub, the second finger comprising a distal contacting face that is biased into contact with a second biasing face of the second stub, wherein a pin extends through a stub aperture in the first stub, a finger aperture in the first finger, a finger aperture in the second finger, and a stub aperture in the second stub. The method includes repositioning the stub substrate to a second angular orientation relative to the finger substrate, wherein frictional contact between at least the distal contacting face of the first finger and the first biasing face of the first stub and between the distal contacting face of the second finger and the second biasing face of the second stub causes the stub substrate to maintain the second angular orientation relative to the finger substrate.

In another example, a method of assembling a friction hinge includes providing a stub substrate comprising a first stub and an adjacent second stub extending from the stub substrate, and providing a finger substrate comprising a first finger and an adjacent second finger extending from the finger substrate. The first finger comprises a distal contacting face and a ramping surface between its distal contacting face and the finger substrate, and the second finger comprising a distal contacting face and a ramping surface between its distal contacting face and the finger substrate.

The first stub is inserted at a base of the ramping surface of the first finger, and the second stub is inserted at a base of the ramping surface of the second finger. The method further includes sliding the first stub along the ramping surface of the first finger toward its distal contacting face, and sliding the second stub along the ramping surface of the second finger toward its distal contacting face, thereby biasing the first finger's distal contacting face against the first stub and the second finger's distal contacting face against the second stub. The method includes aligning a first stub aperture in the first stub, a first finger aperture in the first finger, a second finger aperture in the second finger, and a second stub aperture in the second stub. A pin is then inserted through the first stub aperture, the first finger aperture, the second finger aperture, and the second stub aperture.

BRIEF DESCRIPTION OF THE DRAWINGS

FIGS. 14A and 14B show a flow diagram of an example method of operating a friction hinge according to examples of the present disclosure.

FIG. 15 shows a flow diagram of an example method of assembling a friction hinge according to examples of the present disclosure.

DETAILED DESCRIPTION

Figure 1:
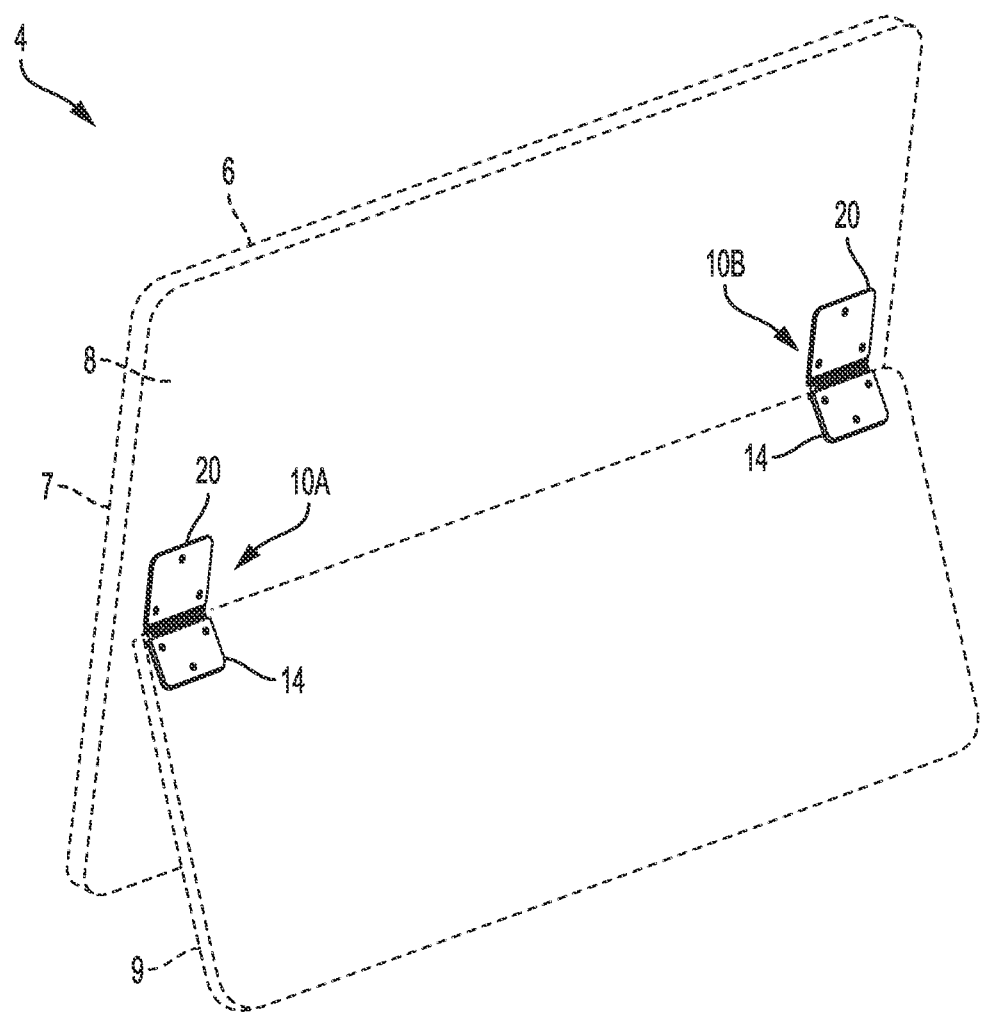
FIG. 1 shows one example of a computing device utilizing the friction hinge according to examples of the present disclosure.

A wide variety of products and components utilize two substrates that are rotatably coupled via one or more hinges. In the field of computing devices for example, some tablet computing devices utilize a kickstand rotatably coupled to a display substrate via one or more friction hinges. In a laptop device, one or more friction hinges rotatably couple a display to another substrate containing one or more input devices, such as a keyboard and a trackpad. Some computing devices utilize two or more displays that are rotatable coupled via one or more friction hinges. Many other products and components can utilize friction hinge(s) in a similar manner.

In some examples, an interlocking finger hinge of alternating fingers creates a frictional resistance to rotation by compressing the fingers together via tightening nuts on each end of a pin. In these examples, the nuts squeeze the fingers together and create a tensile force on the pin via mechanical features such as threads on the pin. In other examples, a hinge may utilize an interference fit with a pin that extends through multiple fingers. Each finger clamps onto the pin to create a frictional resistance to rotation.

In these examples the pin is a potential failure point, and if the pin breaks all friction across the hinge is lost. Accordingly, the pin must be large enough to withstand the forces it experiences over the life of the product. It follows that this requirement limits a potential reduction in the size of the pin, thereby preventing an overall thickness of the hinge from being reduced beyond a minimum thickness. In some of these designs, additional components such as tightening nuts also create a more time-intensive and complicated assembly process. Additionally in many of these designs, when the hinge and two substrates are closed, a "spring back" torque remains that urges the substrates to open. In these designs, additional closure components that keep the substrates closed, such as a closure mechanism and/or one or more sets of magnets, are sometimes required.

Accordingly, examples are disclosed that relate to friction hinges that address one or more of the above issues and reduce or substantially eliminate forces exerted on the pin. Advantageously, these designs allow the pin diameter to be significantly reduced, thereby enabling the overall thickness of the hinge and corresponding product or component to be correspondingly reduced. Further and as described in more detail below, the present configurations do not generate a torsional spring-back force, thereby allowing the corresponding substrates to remain closed without requiring additional closure components. Additionally, methods for assembling friction hinges that simplify assembly processes are also disclosed.

In the following discussion, an example computing device is described that employs one example of the hinges and assembly techniques described herein. Embodiments of the present disclosure are not limited to the example device and may be utilized with a variety of devices, whether computing-related or other devices, that rotatably couple two substrates and have different form factors and functions. In different examples, one hinge or a plurality of hinges are utilized to rotatably couple substrates of the device or component. Additionally, in the descriptions provided herein, ordinal numbers such as first and second are used for convenience and ease of description, and do not denote any order or arrangement of components.

With reference now to FIG. 1, one example of a computing device is illustrated in the form of a tablet computing device 4. In other examples, the computing device may take the form of a laptop computing device, dual-screen mobile computing device, or any other suitable computing device. In the example of FIG. 1, the tablet computing device 4 includes a first substrate 6 that comprises a touch screen display 7 (facing away in this view) and a rear panel 8 opposite to the display. The first substrate 6 is rotatably coupled to a kickstand 9 (second substrate) by a pair of friction hinges 10A and 10B having the same construction and described in more detail below. In other examples, a single friction hinge 10 or three or more friction hinges 10 may be utilized to couple a first substrate to a second substrate.

Figure 2:
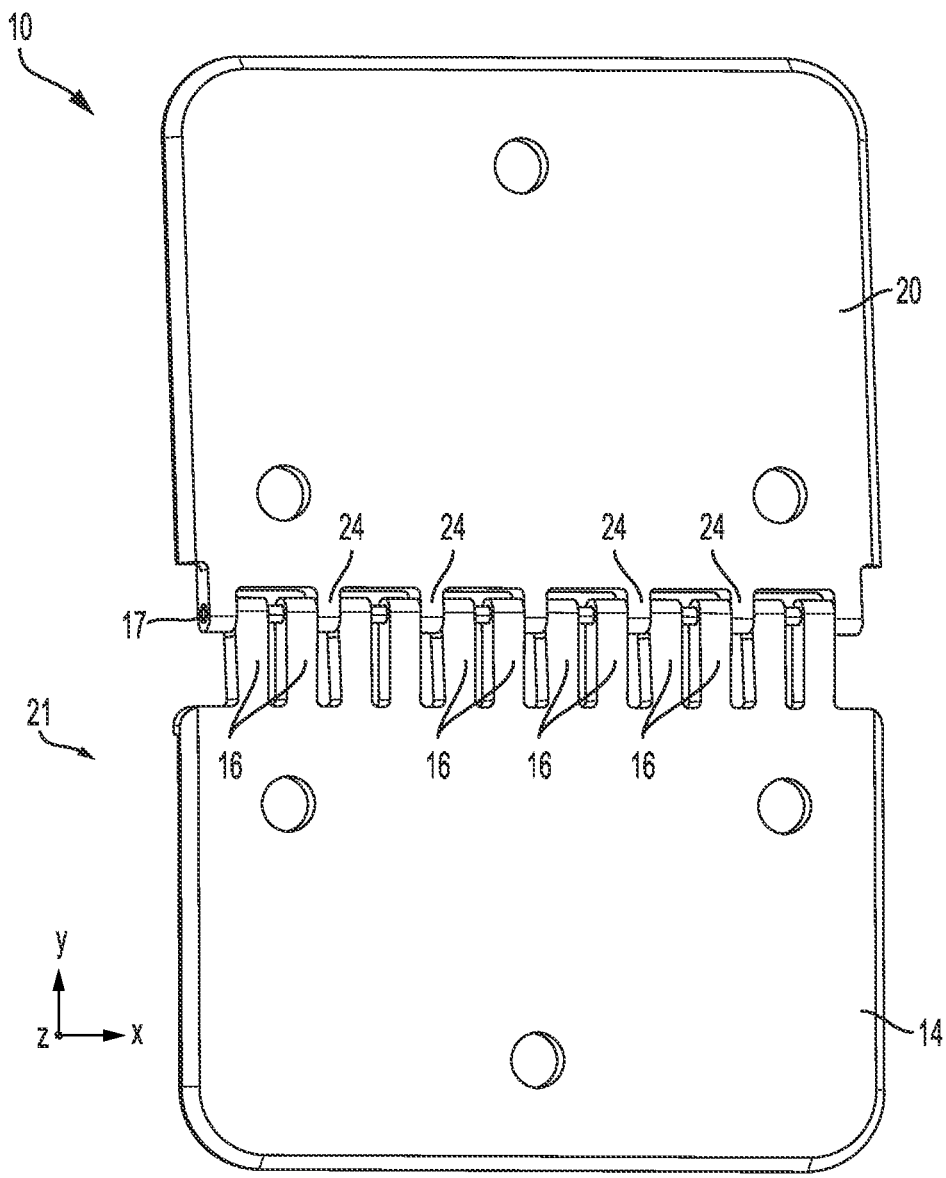
FIG. 2 shows an assembled friction hinge according to examples of the present disclosure.

As described in more detail below and with reference to FIG. 2, each of the friction hinges 10A and 10B comprises a finger substrate 14 including a plurality of fingers 16 and a stub substrate 20 including a plurality of stubs 24. As described and illustrated further below, two fingers 16 are inserted between adjacent stubs 24 in a repeating pattern across the length of the friction hinge 10. Advantageously, adjacent fingers 16 are configured with an intentional interference with respect to the two stubs 24 between which the fingers are inserted. Accordingly, during assembly the fingers 16 are biased between the solid stubs 24 to create a preloaded frictional interface. A guide pin 17 is then inserted through the fingers 16 and stubs 24 to guide the center of rotation.

In this manner and in one advantage of the present disclosure, this configuration eliminates the tensile forces exerted on the pin in other designs, thereby enabling the pin and other components to be reduced in size to provide a low-profile friction hinge that can be utilized in much thinner products and components. Further, example friction hinges of this configuration can utilize only three components, thereby providing cost-savings as compared to more complicated hinge designs. Additionally and as described in more detail below, the simple design of the disclosed configurations enables an easy and quick assembly process that can reduce manufacturing costs.

For purposes of the present disclosure, the term "adjacent" means that a first component is next to a second component of the same type without one or more other components of the same type in between the first and second component. For example and with reference to FIG. 3, the first finger 16-1 is adjacent to the third finger 16-3 because no additional finger(s) 16 are located between the first finger 16-1 and the third finger 16-3.

With reference now to FIGS. 2-11, descriptions of an example friction hinge according to the present disclosure will now be provided. In this example, the friction hinge 10 includes twelve fingers 16 and seven stubs 24. In other examples, friction hinges of the present disclosure can utilize as few as two fingers 16 and two stubs 24, or any other suitable number of fingers and stubs. Further, and in another advantage of the present disclosure, friction hinges as described herein can be easily scaled in size by adding additional fingers 16 to a finger substrate and corresponding stubs 24 to a stub substrate.

It will be appreciated that the following description of selected fingers 16 and stubs 24 applies to each of the fingers and corresponding stubs of the friction hinge 10.

Figure 3:
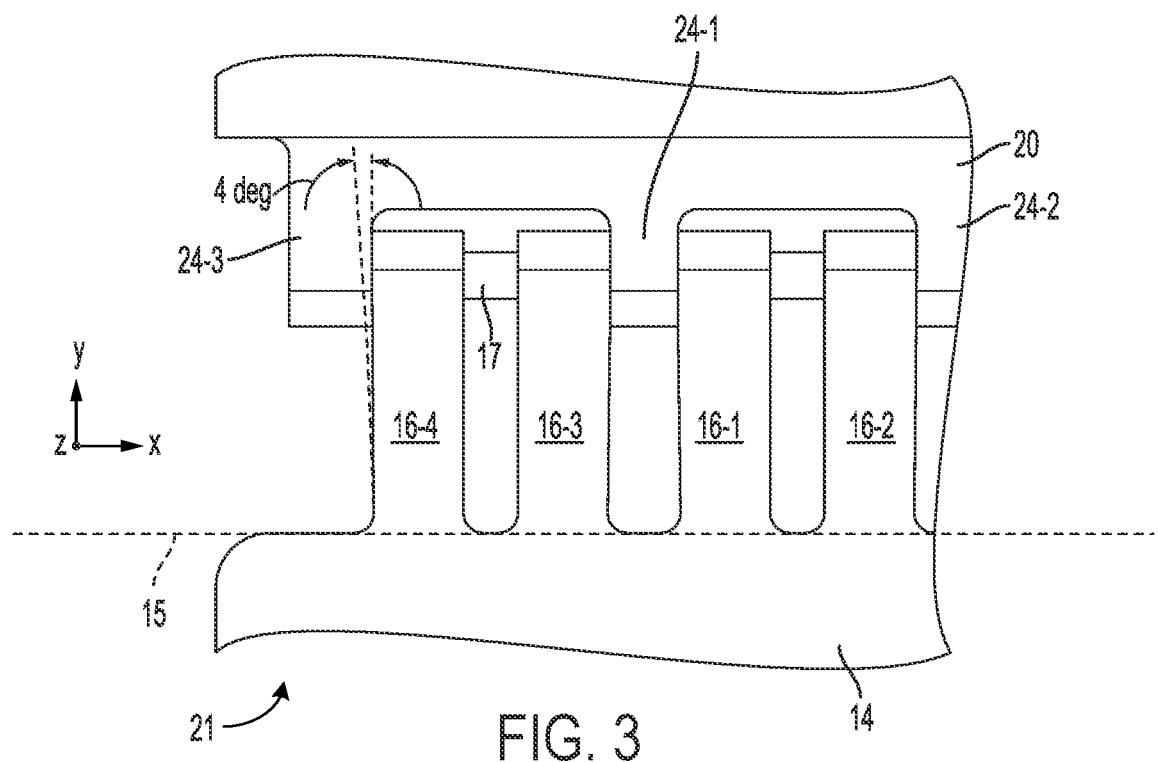
FIG. 3 shows an enlarged partial view of fingers and stubs of the friction hinge of FIG. 2 according to examples of the present disclosure.
Figure 4:
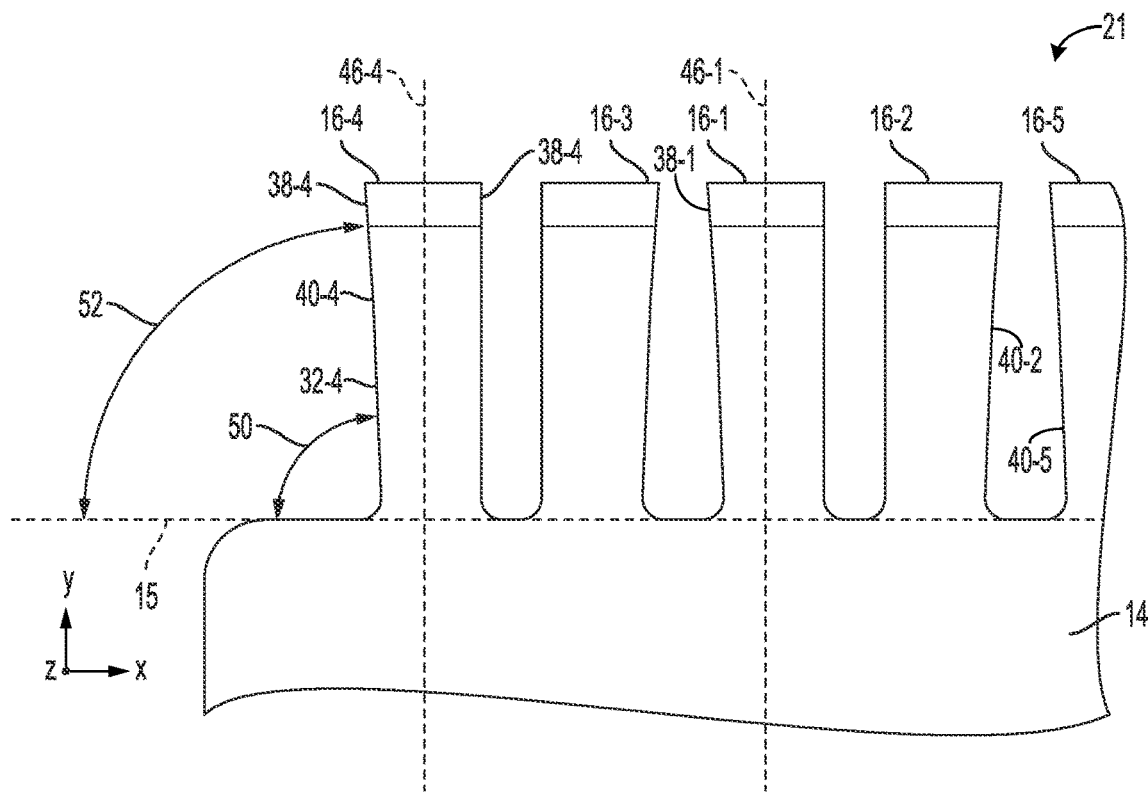
FIG. 4 shows an enlarged partial view of fingers of the friction hinge of FIG. 2 prior to assembly according to examples of the present disclosure.

With reference now to FIGS. 3 and 4, in this example the friction hinge 10 includes a first finger 16-1 and adjacent second finger 16-2 axially spaced from the first finger extending from a left side 21 of the finger substrate 14. As shown in FIG. 3 and with reference also to FIG. 6, the first finger 16-2 and second finger 16-3 both extend between a first stub 24-1 and an adjacent second stub 24-2 that extend from the stub substrate 20.

As described in more detail below and with reference to FIGS. 4-7, the first finger 16-1 comprises a distal contacting face 38-1 of a contacting side 32-1 that is biased into contact with a first biasing face 26-1 of the first stub 24-1. In a similar manner, the second finger 16-2 comprises a distal contacting face 38-2 of a contacting side 32-2 that is biased into contact with a second biasing face 28-2 of the second stub 24-2. First finger 16-1 and second finger 16-2 have the same shape and are rotated 180 degrees relative to one another. In one advantage of the present disclosure, and as described further below, the biasing of the distal contacting faces 38 of the fingers 16 is achieved by angling the contacting sides 32 of each finger to cooperate with the stubs 24 in a manner that deflects the fingers laterally in an x-axis direction when the stubs are inserted between every other pair of fingers and moved along the contacting sides to the distal contacting faces 38. This deflection of each finger generates biasing forces that urge the distal contacting faces 38 of each finger against corresponding biasing faces 26 of the stubs 24, thereby creating frictional interfaces that resist rotation of the contacting faces relative to the biases faces. Advantageously in this manner, when the finger substrate 14 and stub substrate 20 (and corresponding attached substrates) are rotated to a desired angle and released, the frictional interfaces of hinge 10 maintain the substrates at the desired angle.

In the present example, each of the fingers 16 has the same shape. Additionally, the fingers 16 are oriented along the longitudinal axis 15 of the finger substrate 14 in a manner that each finger is rotated 180 degrees relative to its adjacent finger(s). For example and with reference to FIGS. 4 and 5, the first finger 16-1 is rotated 180 degrees about its longitudinal axis 46-1 relative to the second finger 16-2, such that a distal non-contacting face 44-1 of the first finger faces a distal non-contacting face 44-2 of the second finger. In a similar manner, the first finger 16-1 is rotated 180 degrees about its longitudinal axis 46-1 relative to the third finger 16-3. Further and as described in more detail below, each pair of fingers 16 located between two stubs 26 interacts with the stubs in the same manner. Accordingly, and in another advantage of the present disclosure, this repeating configuration of fingers 16 and stubs 26 provides consistent and substantially equivalent frictional interfaces along the length of the friction hinge 10 to balance and distribute the frictional resistance across the hinge.

Figure 5:
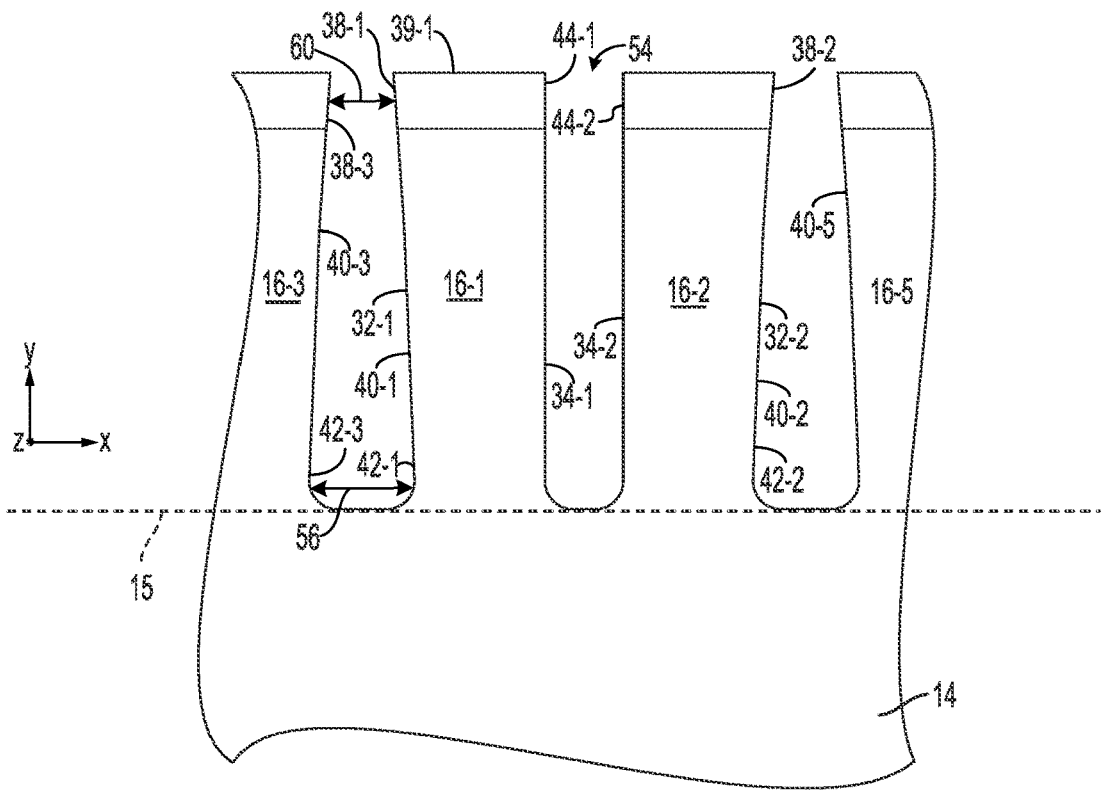
FIG. 5 shows an enlarged partial view of fingers of the friction hinge of FIG. 4 prior to assembly according to examples of the present disclosure.

With reference now to FIG. 5, the first finger 16-1 also comprises a distal non-contacting face 44-1 on a non-contacting side 34-1 that is opposite to its distal contacting face 38-1. Similarly, the second finger 16-2 comprises a distal non-contacting face 44-2 on a non-contacting side 34-2 that is opposite to its distal contacting face 38-2. As shown in FIG. 5, the distal non-contacting face 44-1 of the first finger 16-1 and the distal non-contacting face 44-2 of the second finger 16-2 define an opening 54 between these faces. In another potential advantage of the present disclosure, the opening 54 between adjacent distal non-contacting faces 44-1 and 44-2 provides space for the first finger 16-1 and second finger 16-2 to deflect toward one another during assembly, thereby pre-loading the fingers to bias their distal contacting faces 38-1 and 38-2 into the corresponding first biasing face 26-1 and second biasing face 28-2 of the first stub 24-1 and the second stub 24-2, respectively.

FIGS. 4 and 5 depict a portion of the fingers 16 prior to assembly in pre-assembly positions. As shown in these figures and with reference also to FIG. 8, each of the fingers 16 also comprises a ramping surface 40 between its distal contacting face 38 and the finger substrate 14, with each ramping surface forming a ramp angle 50 less than 90 degrees with respect to the longitudinal axis 15 of the finger substrate (see example in FIG. 4). In the present example, the ramp angle 50 is 87.7 degrees. In other examples, other suitable ramp angles can be utilized. While FIG. 4 shows the ramp angle 50 of the ramping surface 40-4 of the fourth finger 16-4, it will be appreciated that the ramping surface 40 of each finger 16 along the finger substrate 14 forms the same ramp angle 50 with respect to the longitudinal axis 15 of the finger substrate. Accordingly, and in another potential advantage of the present configuration, adjacent ramping surfaces 40 of adjacent fingers 16 form a lower receiving space that enables the insertion a corresponding stub 24 at a base 42 of the ramping surfaces, while also causing the deflection of the fingers and corresponding bias pre-loading as the stub is moved along the ramping surfaces to the distal contacting faces 38 of the adjacent fingers.

Figure 6:
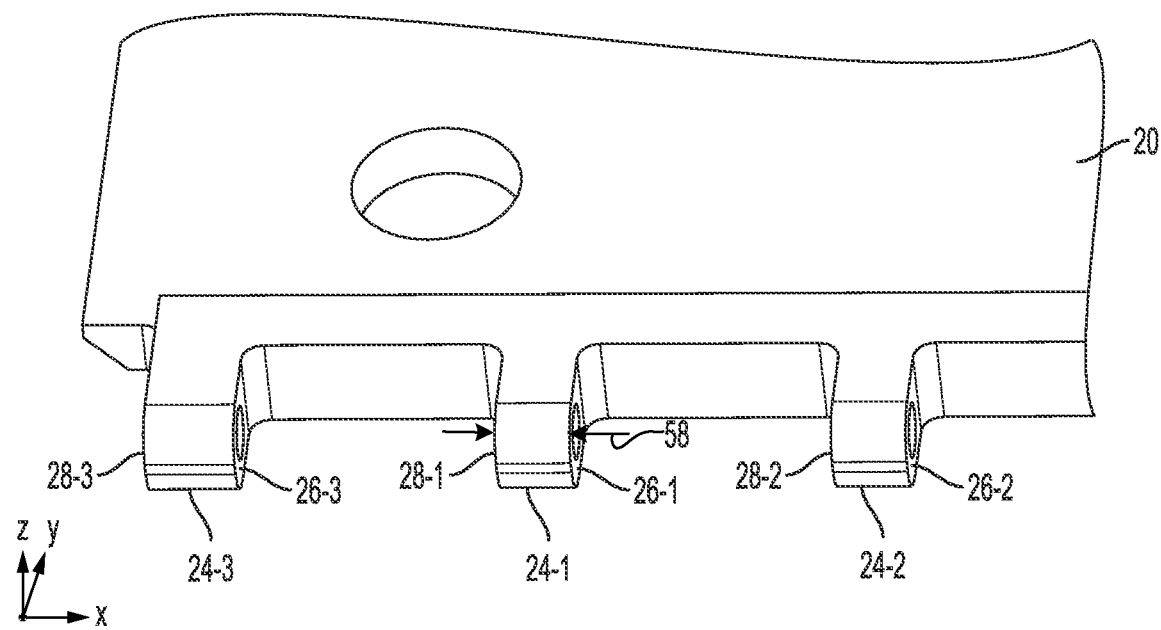
FIG. 6 shows an enlarged partial view of stubs of the friction hinge of FIG. 2 prior to assembly according to examples of the present disclosure.

For example and with reference to FIGS. 5 and 6, a width 56 between adjacent bases 42-1 and 42-3 of ramping surfaces 40-1 and 40-3 of first finger 16-1 and third finger 16-3, respectively, is greater than the width 58 of the first stub 24-1. In one example, the width 56 between adjacent bases 42-1 and 42-3 is 0.94 mm and the width 58 of the first stub 24-1 is 0.85 mm. In other examples, other suitable widths 56 and 58 can be utilized to accommodate different configurations. In this manner, with reference also to FIG. 9 and as described in more detail below, this configuration allows the first stub 24-1 to be inserted between the first finger 16-1 and third finger 16-3 at the bases 42-1 and 42-3 of ramping surfaces 40-1 and 40-3. In the present example, each stub 24 has the same width 58 and the width between adjacent bases 42 of the ramping surfaces 40 of each pair of adjacent fingers 16 is the same width 56. Accordingly, this configuration allows each stub 24 to be inserted between corresponding fingers 16 at the bases 42 of ramping surfaces 40 of the fingers across the friction hinge 20.

With reference again to FIG. 5, the adjacent ramping surfaces 40 of adjacent fingers 16 are angled inwardly toward one another in a manner that reduces the gap between these surfaces in the positive y-axis direction. For example, and in another potential advantage of the present disclosure, between the bases 42-1 and 42-3 of fingers 16-1 and 16-3 and their distal contacting faces 38-1 and 38-3, respectively, the gap between the adjacent ramping surfaces 40-1 and 40-3 is gradually reduced to a distance less than the width 58 of the first stub 24-1. In this example, a distance 60 between contacting surfaces 38-1 and 38-3 is 0.76 mm. Advantageously, and as described in more detail below, as the first stub 24-1 is moved along the adjacent ramping surfaces 40-1 and 40-3 to the distal contacting faces 38-1 and 38-3, the first stub biases the distal contacting face 38-1 of the first finger 16-1 in a positive x-axis direction and biases the distal contacting face 38-3 of the third finger 16-3 in the opposite, negative x-axis direction away from the first finger 16-1.

The second stub 24-2 interacts with the adjacent ramping surfaces 40-2 and 40-5 of the second finger 16-2 and fifth finger 16-5, respectively, in the same manner. Accordingly, as the first stub 24-1 and second stub 24-2 are moved toward the distal contacting faces of the fingers, the second stub biases the distal contacting face 38-2 of the second finger 16-2 in the negative x-axis direction toward the first finger 16-1. Accordingly, in this configuration the first stub 24-1 deflects the first finger 16-1 toward the second finger 16-2, and the second stub 24-2 deflects the second finger 16-2 toward the first finger 16-1.

As noted above, FIGS. 4 and 5 depict a portion of the fingers 16 in pre-assembly positions. As described above, the first stub 24-1 deflects the first finger 16-1 from the first pre-assembly position shown in FIGS. 4 and 5 to a first post-assembly position as shown in FIG. 3 that causes the distal contacting face 38-1 of the first finger to exert an axial force in the negative x-axis direction on the first biasing face 26-1 of the first stub (see also FIGS. 6 and 7). In a similar manner, the second stub 24-2 deflects the second finger 16-2 from the second pre-assembly position shown in FIGS. 4 and 5 to a second post-assembly position as shown in FIG. 3 that causes the distal contacting face 38-2 of the second finger to exert an axial force in a positive x-axis direction on the second biasing face 28-2 of the second stub. In the present example, as indicated in FIG. 3 and described in more detail below, the first finger 16-1 and second finger 16-2 (and each other finger 16) are deflected 4 degrees by their corresponding stubs 24 from their pre-assembly positions to their post-assembly positions of FIG. 3 as the stubs are moved in the positive y-axis direction to the distal contacting faces 38 of the fingers. In other configurations, the stubs 24 can deflect the fingers 16 by different amounts.

Figure 7:
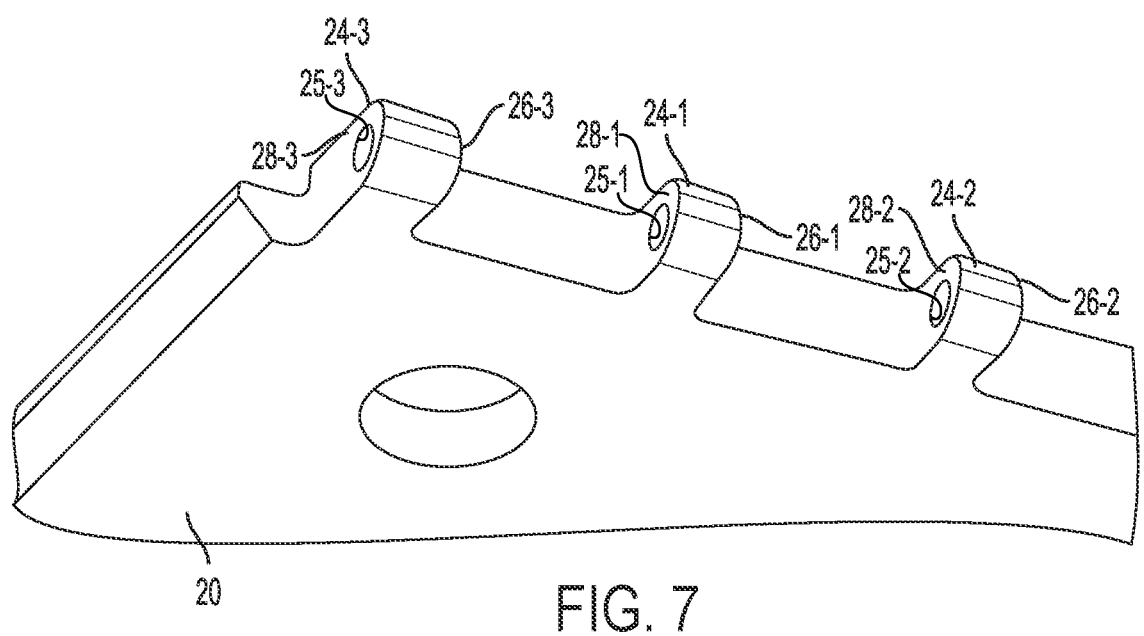
FIG. 7 shows another view of the stubs of FIG. 6 according to examples of the present disclosure.
Figure 8:
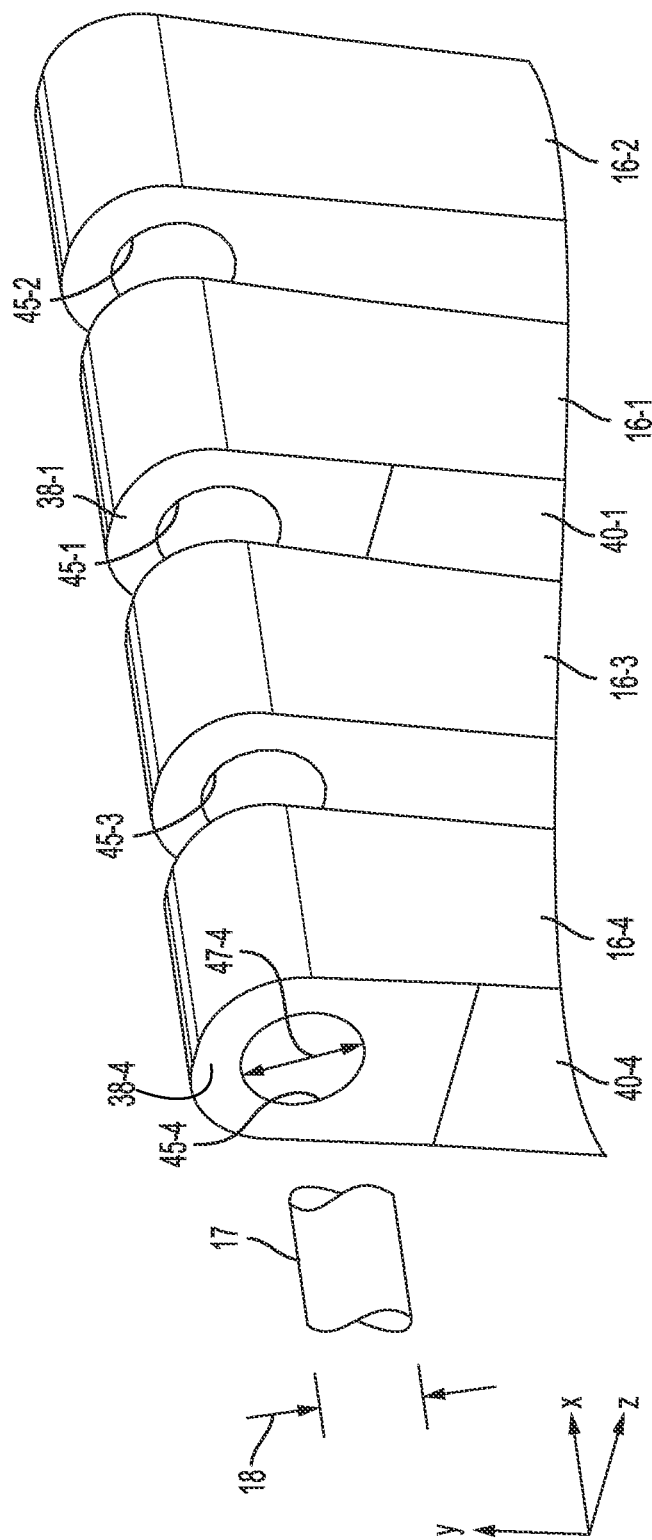
FIG. 8 shows an enlarged partial view of fingers and a portion of the pin of the friction hinge of FIG. 2 according to examples of the present disclosure.

In this example and with reference to FIGS. 6-8, in another potential advantage of the present disclosure, when the first finger 16-1 and second finger 16-2 are in the first post-assembly position and second post-assembly position, respectively, as shown in FIG. 3, the plane of the distal contacting face 38-1 of the first finger 16-1 is substantially parallel with and flush to the plane of the first biasing face 26-1 of the first stub 24-1. Similarly, the plane of the distal contacting face 38-2 of the second finger 16-2 is substantially parallel with and flush to the plane of the second biasing face 28-2 of the second stub 24-2. In this example, these planes are at 90 degrees relative to the longitudinal axis 15 of the finger substrate 14. Advantageously, this configuration ensures that a majority or substantially all of the surface areas of the distal contacting faces 38 and corresponding biasing faces 26 are in contact to provide smooth frictional interfaces between the surfaces across the friction hinge 10.

In the present example and with reference again to FIG. 4, to align the planes of the distal contacting faces 38 and the first biasing faces 26, each of the distal contacting faces forms a contact angle 52 that is less than the ramp angle 50 with respect to the longitudinal axis 15 of the finger substrate 14. In this example, the contact angle 52 is 86.0 degrees, as shown in FIG. 4 for the distal contacting face 38-4 of the fourth finger 16-4. In other examples, other suitable contact angles 52 that are less than the corresponding ramp angle 50 can be utilized. Advantageously and in the present example, the contact angle 52 is selected in coordination with the amount of deflection induced by the stubs 24 to produce the planar alignment of the distal contacting faces 38 and corresponding biasing faces described above. Additionally, in another potential advantage of the present disclosure, by configuring the ramping surfaces 40 to have a greater (less severe) angle than the distal contacting faces 38 relative to the longitudinal axis 15 of the finger substrate 14, the ramping surfaces 40 interact with the stubs 24 to provide a gradual lateral biasing of the fingers 16 as the stubs are moved to the distal contacting faces 38 of the fingers.

In other examples, the ramping surfaces 40 and distal contacting faces 38 can have different angles that produce smaller or greater finger deflections and corresponding biasing forces. In some examples the ramping surfaces 40 and distal contacting faces 38 can have the same angle relative to the longitudinal axis 15 of the finger substrate 14.

With respect to the above description, it will be appreciated that each stub 24 interacts with the adjacent ramping surface(s) 40 in the same manner across the length of the friction hinge 10.

As noted above, a guide pin 17 is inserted through apertures in the fingers 16 and stubs 24 to guide the center of rotation of the fingers and stubs. Advantageously, because the present configurations create frictional interfaces by biasing the distal contacting faces 38 of the fingers 16 against the biasing faces 26 of the stubs 24, these configurations allow the pin 17 to merely guide rotation of the fingers and stubs, and correspondingly reduce or substantially eliminate forces exerted on the pin. Advantageously, these designs allow the pin diameter to be significantly reduced, thereby enabling the overall thickness of the hinge and corresponding product or component to be correspondingly reduced.

Accordingly, in the present examples the pin 17 has a pin diameter 18 that is smaller than the apertures in the fingers 16 and stubs 24. With reference to FIG. 8, in this example the pin 17 has a pin diameter 18 that is less than the aperture diameter 47-4 of the finger aperture 45-4 in the fourth finger 16-4. It will be appreciated that the finger apertures 45-3, 45-1, 45-2 of the third finger 16-3, first finger 16-1, and second finger 16-2, respectively, (as well as the finger apertures of the other fingers 16) have the same aperture diameter as the aperture diameter 47-4 of the fourth finger 16-4. Similarly and with reference to FIG. 7, in this example the stub apertures 25-3, 25-1, 25-2 of the third stub 24-3, first stub 24-1, and second stub 24-2, respectively, (as well as the stub apertures of the other stubs 24) have the same aperture diameter as the aperture diameter 47-4 of the fourth finger 16-4.

In the present example, the pin 17 has a pin diameter 18 of 0.6 mm and the fingers apertures 45 and stub apertures 25 have aperture diameters of 0.65 mm. Advantageously, by undersizing the pin 17 with respect to the apertures, the pin is afforded a measure of free movement within the apertures that enables the above-described deflections of the fingers 16. Further and in another advantage of the present disclosure, this configuration does not generate a torsional spring-back force on the fingers 16 or stubs 24, thereby allowing the corresponding substrates to remain closed without requiring additional closure components.

Figure 12:
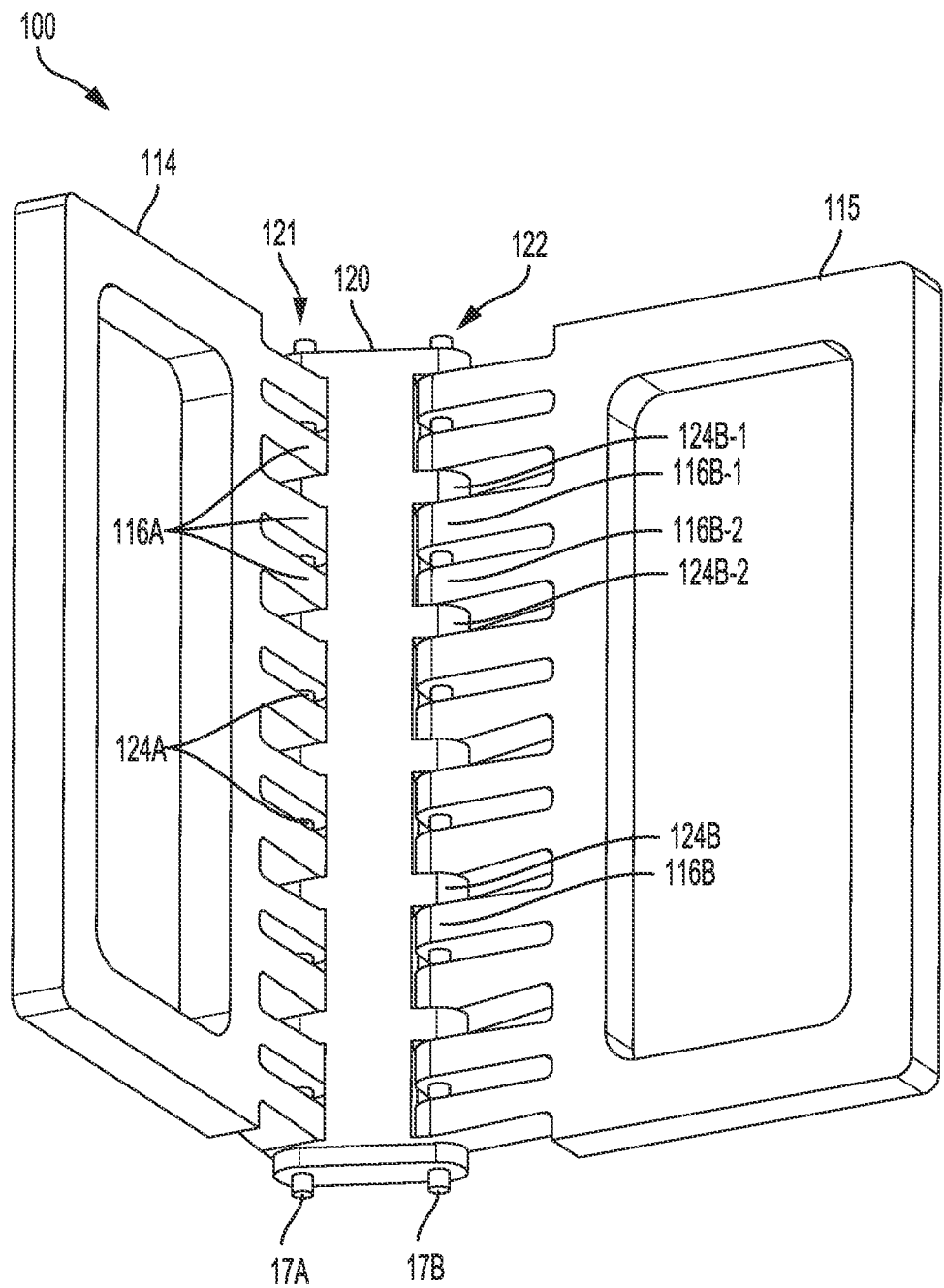
FIG. 12 shows an assembled friction hinge according to another example of the present disclosure.
Figure 13:
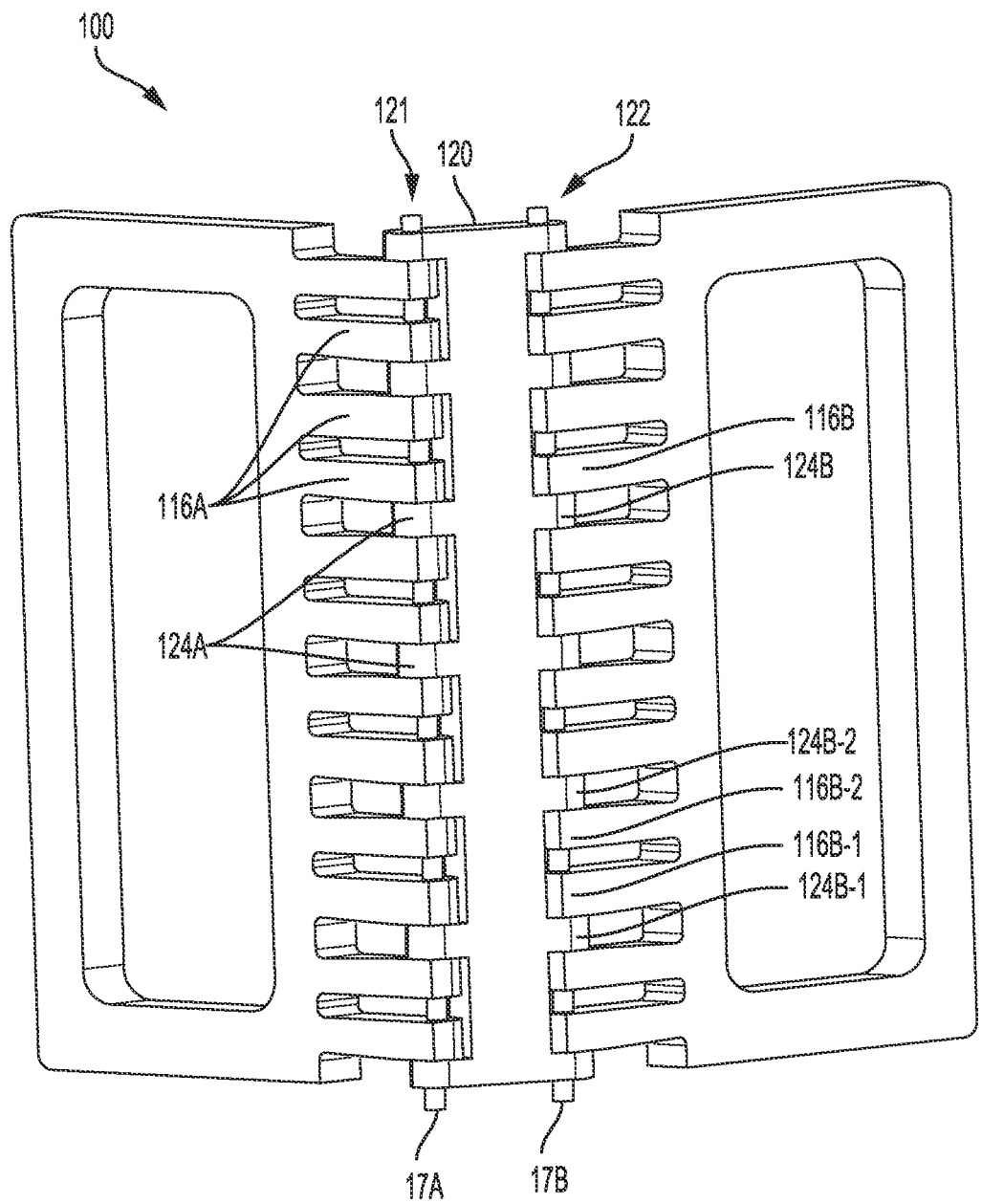
FIG. 13 shows another view of the friction hinge of FIG. 12.

In some examples, friction hinges of the present disclosure can utilize a multi-pivot configuration in which a stub substrate includes opposing sides of stubs that are rotatably coupled to fingers of opposing finger substrates using the frictional interfaces described above. With reference now to FIGS. 12 and 13, one example of a friction hinge 100 according to this configuration is provided. In this example, the friction hinge 100 comprises a stub substrate 120 having a first side 121 and opposing second side 122. Extending from the first side 121 are a plurality of stubs 124A that each have the same configuration as stubs 24 described above. Extending from the second side 122 are a plurality of opposing stubs 124B that also have the same configuration as stubs 24.

A finger substrate 114 includes a plurality of fingers 116A extending from the substrate and having the same shape and configuration as the fingers 16 described above. Two fingers 116A are inserted between adjacent stubs 124A in a repeating pattern across the length of the friction hinge 100. Adjacent fingers 116A are configured with an intentional interference with respect to the two stubs 124A between which the fingers are inserted to create a preloaded frictional interface in the same manner and configuration as described above for the fingers 16 and stubs 124 of friction hinge 10. A guide pin 17A is then inserted through apertures in the fingers 116A and stubs 124A to guide the center of rotation.

In a similar manner, an opposing finger substrate 115 includes a plurality of opposing fingers 116B extending from the substrate and having the same shape and configuration as the fingers 16 described above. Two opposing fingers 116B are inserted between adjacent opposing stubs 124B in the same repeating pattern across the length of the friction hinge 100. Adjacent opposing fingers 116B are configured with an intentional interference with respect to the two opposing stubs 124B between which the fingers are inserted to create a preloaded frictional interface in the same manner and configuration as described above for the fingers 16 and stubs 124 of friction hinge 10.

For example and like fingers 16 described above, an opposing first finger 116B-1 comprises an opposing first distal contacting face that is biased into contact with an opposing first biasing face of an opposing first stub 124B-1. An opposing second finger 116B-2 is adjacent to and axially spaced from the opposing first finger 116B-1 and extends from the opposing finger substrate 115 between the opposing first stub 124B-1 and opposing second stub 124B-2. The opposing second finger 116B-2 comprises an opposing second distal contacting face that is biased into contact with an opposing second biasing face of the opposing second stub 124B-2. An opposing guide pin 17B is then inserted through apertures in the opposing fingers 116B and opposing stubs 124B to guide the center of rotation.

Accordingly, and in one potential advantage of this configuration, the multi-pivot friction hinge 100 provides dual, opposing rotational interfaces that enable the finger substrate 114 and opposing finger substrate 115 (and any other attached substrates or components) to be statically positioned in a variety of angular orientations.

With reference now to FIGS. 14A and 14B, an example method 200 of operating a friction hinge comprising a stub substrate rotatably coupled to a finger substrate will now be described. FIGS. 14A and 14B illustrate a flow diagram depicting the method 200. The following description of method 200 is provided with reference to the components described herein and shown in FIGS. 1-13.

It will be appreciated that following description of method 200 is provided by way of example and is not meant to be limiting. Therefore, it is to be understood that method 200 may include additional and/or alternative steps relative to those illustrated in FIGS. 14A and 14B. Further, it is to be understood that the steps of method 200 may be performed in any suitable order. Further still, it is to be understood that one or more steps may be omitted from method 200 without departing from the scope of this disclosure. It will also be appreciated that method 200 also may be performed in other contexts using other suitable components.

With reference to FIG. 14A, at 204 the method 200 includes positioning the stub substrate at a first angular orientation relative to the finger substrate, wherein the stub substrate comprises a first stub and an adjacent second stub extending from a stub substrate, and the finger substrate comprises a first finger extending from the finger substrate between the first stub and the second stub, the first finger comprising a distal contacting face that is biased into contact with a first biasing face of the first stub, and the finger substrate comprising a second finger adjacent to and axially spaced from the first finger and extending from the finger substrate between the first stub and the second stub, the second finger comprising a distal contacting face that is biased into contact with a second biasing face of the second stub, wherein a pin extends through a stub aperture in the first stub, a finger aperture in the first finger, a finger aperture in the second finger, and a stub aperture in the second stub. In one example and with reference to FIG. 2, the stub substrate 20 is positioned at an angular orientation of approximately 180 degrees relative to the finger substrate 14. In other examples, any suitable angular orientation can be used.

At 208 the method 200 includes repositioning the stub substrate to a second angular orientation relative to the finger substrate, wherein frictional contact between at least the distal contacting face of the first finger and the first biasing face of the first stub and between the distal contacting face of the second finger and the second biasing face of the second stub causes the stub substrate to maintain the second angular orientation relative to the finger substrate. In one example and with reference to FIG. 11, the stub substrate 20 is rotated relative to the finger substrate 14 to reposition the stub substrate at a second angular orientation of approximately 90 degrees relative to the finger substrate. In other examples, any other suitable angular orientation can be used. Additionally and as described above, the frictional contact between at least the distal contacting face 38-1 of the first finger 16-1 and the first biasing face 26-1 of the first stub 24-1 and between the distal contacting face 38-2 of the second finger 16-2 and the second biasing face 28-2 of the second stub 24-2 causes the stub substrate 20 to resist further rotation relative to the finger substrate 14 when the substrates are released, thereby maintaining the second angular orientation relative to the finger substrate 14.

At 212 the method 200 includes, wherein the first finger comprises a distal non-contacting face opposite to its distal contacting face, and the second finger comprises a distal non-contacting face opposite to its distal contacting face, and the distal non-contacting face of the first finger and the distal non-contacting face of the second finger define an opening between the distal non-contacting face of the first finger and the distal non-contacting face of the second finger. At 216 the method 200 includes, wherein the first finger and the second finger have a same shape. At 220 the method 200 includes, wherein the first finger is rotated 180 degrees about its longitudinal axis relative to the second finger.

With reference now to FIG. 14B, at 224 the method 200 includes, wherein the first stub biases the distal contacting face of the first finger in a first direction, and the second stub biases the distal contacting face of the second finger in a second direction opposite to the first direction. At 228 the method 200 includes, wherein the first stub deflects the first finger toward the second finger, and the second stub deflects the second finger toward the first finger. At 232 the method 200 includes, wherein the first stub deflects the first finger from a first pre-assembly position to a first post-assembly position that causes the distal contacting face of the first finger to exert an axial force in a second direction on the first biasing face of the first stub, and the second stub deflects the second finger from a second pre-assembly position to a second post-assembly position that causes the distal contacting face of the second finger to exert an axial force in a first direction opposite to the second direction on the second biasing face of the second stub.

With reference now to FIG. 15, an example method 300 of assembling a friction hinge will now be described. FIG. 15 illustrates a flow diagram depicting the method 300. The following description of method 300 is provided with reference to the components described herein and shown in FIGS. 1-13.

It will be appreciated that following description of method 300 is provided by way of example and is not meant to be limiting. Therefore, it is to be understood that method 300 may include additional and/or alternative steps relative to those illustrated in FIG. 15. Further, it is to be understood that the steps of method 300 may be performed in any suitable order. Further still, it is to be understood that one or more steps may be omitted from method 300 without departing from the scope of this disclosure. It will also be appreciated that method 300 also may be performed in other contexts using other suitable components.

With reference to FIG. 15, at 304 the method 300 includes providing a stub substrate comprising a first stub and an adjacent second stub extending from the stub substrate. At 308, the method 300 includes providing a finger substrate comprising a first finger and an adjacent second finger extending from the finger substrate, the first finger comprising a distal contacting face and a ramping surface between its distal contacting face and the finger substrate, and the second finger comprising a distal contacting face and a ramping surface between its distal contacting face and the finger substrate.

Figure 9:
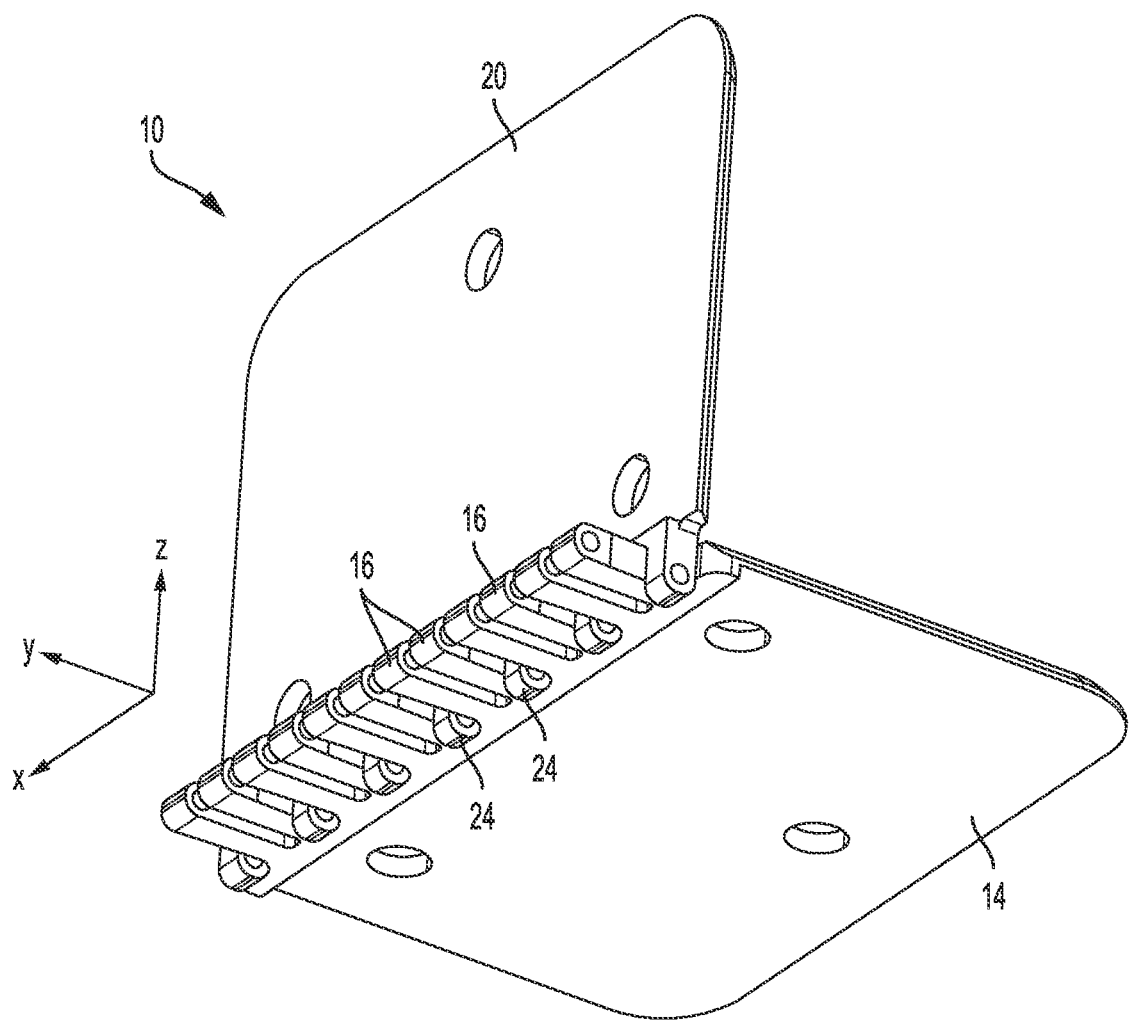
FIG. 9 shows the stubs of the stub substrate inserted between the fingers of the finger substrate of the friction hinge of FIG. 2 according to examples of the present disclosure.
Figure 10:
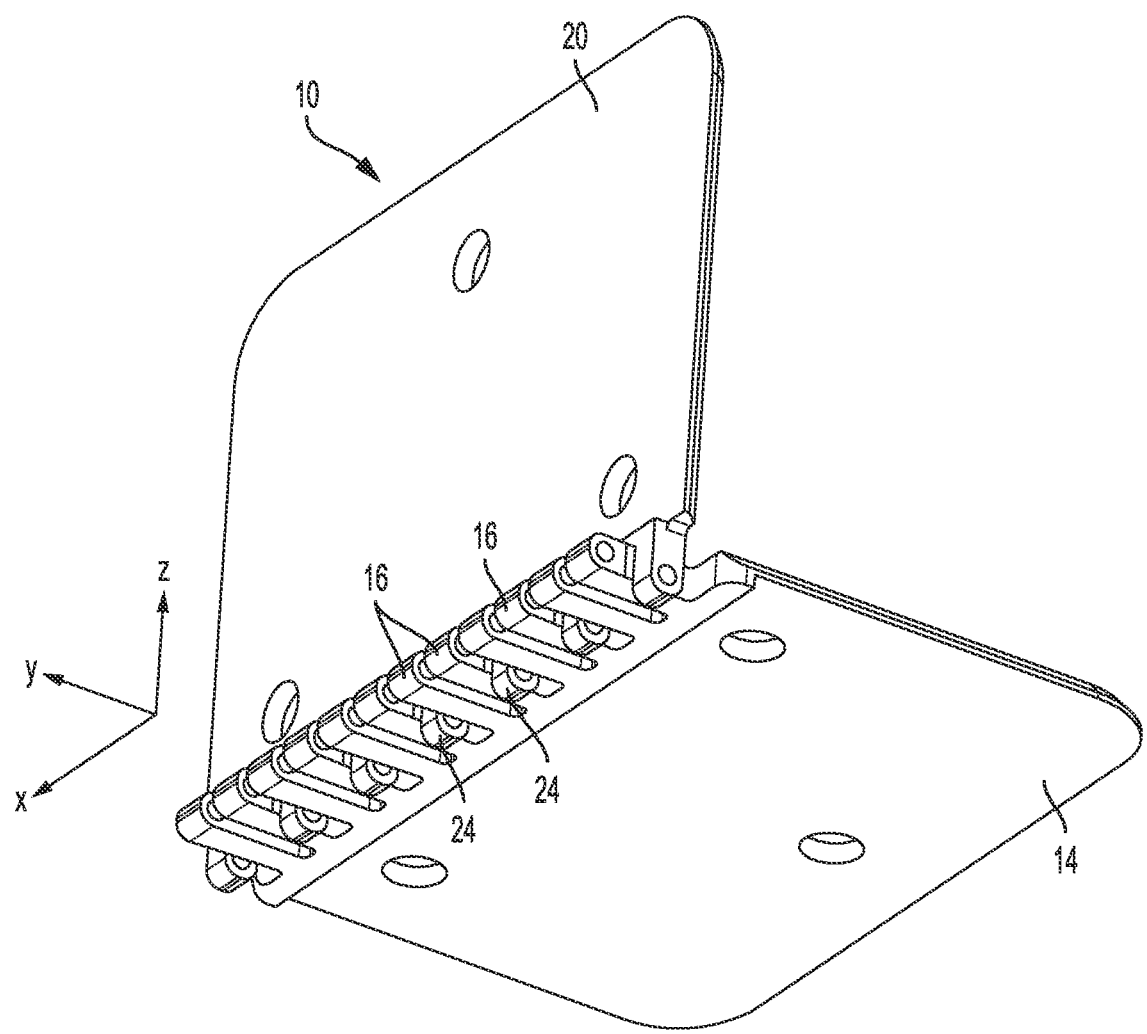
FIG. 10 shows the stubs sliding along ramping surfaces of the fingers according to examples of the present disclosure.
Figure 11:
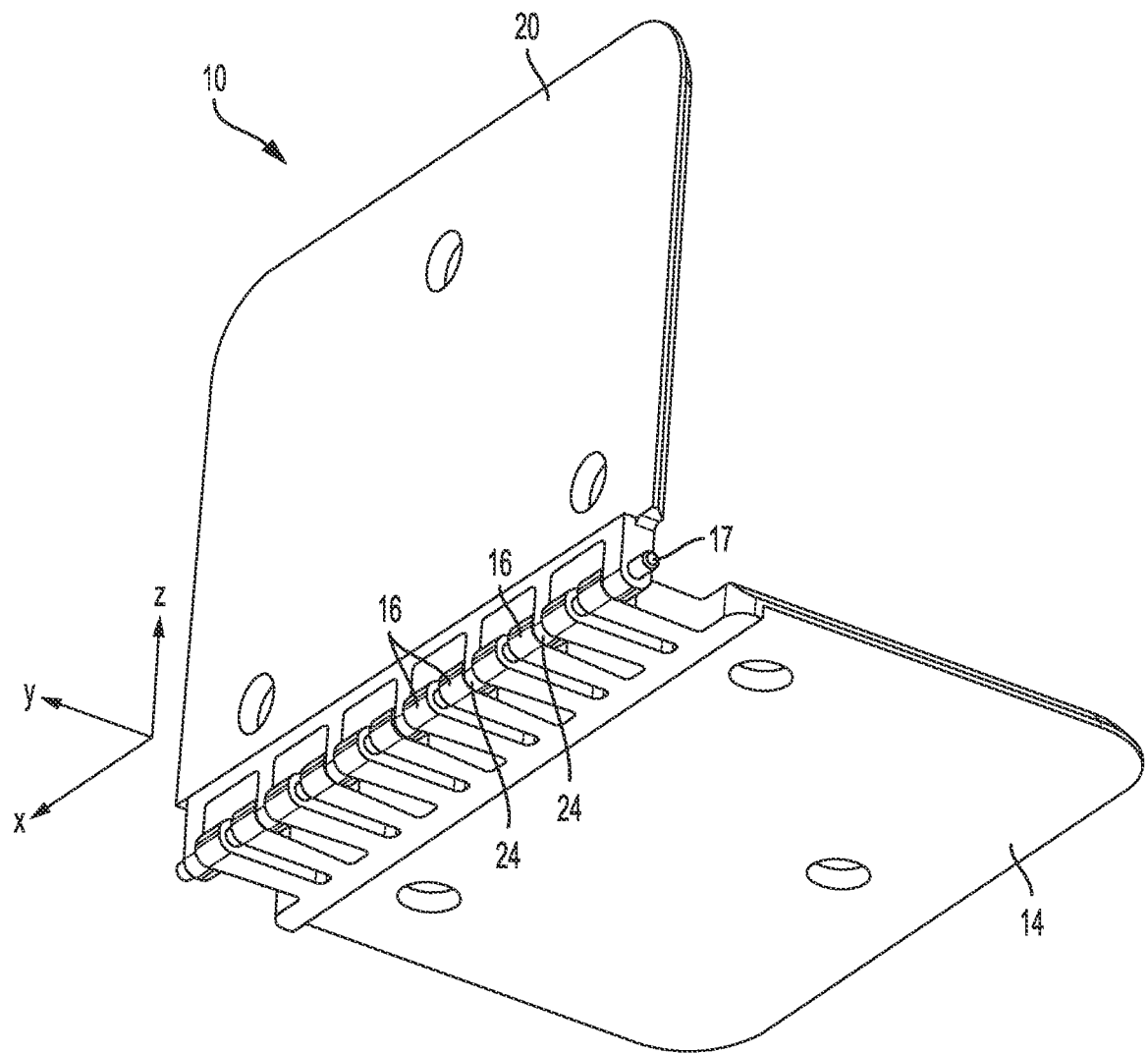
FIG. 11 shows a pin inserted through apertures in the stubs and fingers according to examples of the present disclosure.

At 312, with reference to FIG. 9 and as described above, the method 300 includes inserting the first stub at a base of the ramping surface of the first finger and the second stub at a base of the ramping surface of the second finger. At 316, with reference to FIGS. 10 and 11 and as described above, the method 300 includes sliding the first stub along the ramping surface of the first finger to its distal contacting face and the second stub along the ramping surface of the second finger to its distal contacting face, thereby biasing the first finger's distal contacting face against the first stub and the second finger's distal contacting face against the second stub. At 320 the method 300 includes aligning a first stub aperture in the first stub, a first finger aperture in the first finger, a second finger aperture in the second finger, and a second stub aperture in the second stub. At 324 the method 300 includes inserting a pin through the first stub aperture, the first finger aperture, the second finger aperture, and the second stub aperture.

The following paragraphs provide additional support for the claims of the subject application. One aspect provides a friction hinge, comprising: a first stub and an adjacent second stub extending from a stub substrate; a first finger extending from a finger substrate between the first stub and the second stub, the first finger comprising a distal contacting face that is biased into contact with a first biasing face of the first stub; a second finger adjacent to and axially spaced from the first finger and extending from the finger substrate between the first stub and the second stub, the second finger comprising a distal contacting face that is biased into contact with a second biasing face of the second stub; and a pin extending through a stub aperture in the first stub, a finger aperture in the first finger, a finger aperture in the second finger, and a stub aperture in the second stub.

The friction hinge may additionally or alternatively include, wherein the first finger comprises a distal non-contacting face opposite to its distal contacting face, and the second finger comprises a distal non-contacting face opposite to its distal contacting face, and the distal non-contacting face of the first finger and the distal non-contacting face of the second finger define an opening between the distal non-contacting face of the first finger and the distal non-contacting face of the second finger. The friction hinge may additionally or alternatively include, wherein the first finger and the second finger have a same shape. The friction hinge may additionally or alternatively include, wherein the first finger is rotated 180 degrees about its longitudinal axis relative to the second finger. The friction hinge may additionally or alternatively include, wherein the first stub biases the distal contacting face of the first finger in a first direction, and the second stub biases the distal contacting face of the second finger in a second direction opposite to the first direction. The friction hinge may additionally or alternatively include, wherein the first stub deflects the first finger toward the second finger, and the second stub deflects the second finger toward the first finger.

The friction hinge may additionally or alternatively include, wherein the first stub deflects the first finger from a first pre-assembly position to a first post-assembly position that causes the distal contacting face of the first finger to exert an axial force in a second direction on the first biasing face of the first stub, and the second stub deflects the second finger from a second pre-assembly position to a second post-assembly position that causes the distal contacting face of the second finger to exert an axial force in a first direction opposite to the second direction on the second biasing face of the second stub. The friction hinge may additionally or alternatively include, wherein the first finger comprises a ramping surface between its distal contacting face and the finger substrate, wherein its ramping surface forms a ramp angle less than 90 degrees with respect to a longitudinal axis of the finger substrate. The friction hinge may additionally or alternatively include, wherein the distal contacting face of the first finger forms a contact angle less than the ramp angle with respect to the longitudinal axis of the finger substrate. The friction hinge may additionally or alternatively include, wherein the pin has a pin diameter that is smaller than the stub aperture in the first stub, the finger aperture in the first finger, the finger aperture in the second finger, and the stub aperture in the second stub.

The friction hinge may additionally or alternatively include, a third stub extending from the stub substrate and adjacent to the first stub; a third finger extending between the first stub and the third stub from the finger substrate, the third finger comprising a distal contacting face that is biased into contact with a second biasing face of the first stub; and a fourth finger adjacent to and axially spaced from the third finger and extending between the first stub and the third stub from the finger substrate, the fourth finger comprising a distal contacting face that is biased into contact with a first biasing face of the third stub.

The friction hinge may additionally or alternatively include, wherein the first stub and the second stub extend from a first side of the stub substrate: an opposing first stub and an adjacent opposing second stub extending from a second side of the stub substrate opposite to the first side; an opposing first finger extending from an opposing finger substrate between the opposing first stub and the opposing second stub, the opposing first finger comprising an opposing distal contacting face that is biased into contact with an opposing first biasing face of the opposing first stub; an opposing second finger adjacent to and axially spaced from the opposing first finger and extending from the opposing finger substrate between the opposing first stub and the opposing second stub, the opposing second finger comprising an opposing distal contacting face that is biased into contact with an opposing second biasing face of the opposing second stub; and an opposing pin extending through an opposing first stub aperture in the opposing first stub, an opposing first finger aperture in the opposing first finger, an opposing second finger aperture in the opposing second finger, and an opposing second stub aperture in the opposing second stub.

Another aspect provides a method of operating a friction hinge comprising a stub substrate rotatably coupled to a finger substrate, the method comprising: positioning the stub substrate at a first angular orientation relative to the finger substrate, wherein the stub substrate comprises a first stub and an adjacent second stub extending from a stub substrate, and the finger substrate comprises a first finger extending from the finger substrate between the first stub and the second stub, the first finger comprising a distal contacting face that is biased into contact with a first biasing face of the first stub, and the finger substrate comprising a second finger adjacent to and axially spaced from the first finger and extending from the finger substrate between the first stub and the second stub, the second finger comprising a distal contacting face that is biased into contact with a second biasing face of the second stub, wherein a pin extends through a stub aperture in the first stub, a finger aperture in the first finger, a finger aperture in the second finger, and a stub aperture in the second stub; and repositioning the stub substrate to a second angular orientation relative to the finger substrate, wherein frictional contact between at least the distal contacting face of the first finger and the first biasing face of the first stub and between the distal contacting face of the second finger and the second biasing face of the second stub causes the stub substrate to maintain the second angular orientation relative to the finger substrate. The method may additionally or alternatively include, wherein the first finger comprises a distal non-contacting face opposite to its distal contacting face, and the second finger comprises a distal non-contacting face opposite to its distal contacting face, and the distal non-contacting face of the first finger and the distal non-contacting face of the second finger define an opening between the distal non-contacting face of the first finger and the distal non-contacting face of the second finger. The method may additionally or alternatively include, wherein the first finger and the second finger have a same shape. The method may additionally or alternatively include, wherein the first finger is rotated 180 degrees about its longitudinal axis relative to the second finger. The method may additionally or alternatively include, wherein the first stub biases the distal contacting face of the first finger in a first direction, and the second stub biases the distal contacting face of the second finger in a second direction opposite to the first direction. The method may additionally or alternatively include, wherein the first stub deflects the first finger toward the second finger, and the second stub deflects the second finger toward the first finger. The method may additionally or alternatively include, wherein the first stub deflects the first finger from a first pre-assembly position to a first post-assembly position that causes the distal contacting face of the first finger to exert an axial force in a second direction on the first biasing face of the first stub, and the second stub deflects the second finger from a second pre-assembly position to a second post-assembly position that causes the distal contacting face of the second finger to exert an axial force in a first direction opposite to the second direction on the second biasing face of the second stub.

Another aspect provides a computing device, comprising: a first substrate; a second substrate moveably coupled to the first substrate via a friction hinge, the friction hinge comprising: a first stub and an adjacent second stub extending from a stub substrate; a first finger extending from a finger substrate between the first stub and the second stub, the first finger comprising a distal contacting face that is biased into contact with a first biasing face of the first stub; a second finger adjacent to and axially spaced from the first finger and extending from the finger substrate between the first stub and the second stub, the second finger comprising a distal contacting face that is biased into contact with a second biasing face of the second stub; and a pin extending through a stub aperture in the first stub, a finger aperture in the first finger, a finger aperture in the second finger, and a stub aperture in the second stub.

Another aspect provides a method of assembling a friction hinge, the method comprising: providing a stub substrate comprising a first stub and an adjacent second stub extending from the stub substrate; providing a finger substrate comprising a first finger and an adjacent second finger extending from the finger substrate, the first finger comprising a distal contacting face and a ramping surface between its distal contacting face and the finger substrate, and the second finger comprising a distal contacting face and a ramping surface between its distal contacting face and the finger substrate; inserting the first stub at a base of the ramping surface of the first finger and the second stub at a base of the ramping surface of the second finger; sliding the first stub along the ramping surface of the first finger to its distal contacting face and the second stub along the ramping surface of the second finger to its distal contacting face, thereby biasing the first finger's distal contacting face against the first stub and the second finger's distal contacting face against the second stub; aligning a first stub aperture in the first stub, a first finger aperture in the first finger, a second finger aperture in the second finger, and a second stub aperture in the second stub; and inserting a pin through the first stub aperture, the first finger aperture, the second finger aperture, and the second stub aperture.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A friction hinge, comprising:
a first stub and an adjacent second stub extending from a stub substrate;
a first finger extending from a finger substrate between the first stub and the second stub, the first finger comprising a distal contacting face that is biased into contact with a first biasing face of the first stub;
a second finger adjacent to and axially spaced from the first finger and extending from the finger substrate between the first stub and the second stub, the second finger comprising a distal contacting face that is biased into contact with a second biasing face of the second stub; and a pin extending through a stub aperture in the first stub, a finger aperture in the first finger, a finger aperture in the second finger, and a stub aperture in the second stub.

2. The friction hinge of claim 1, wherein the first finger comprises a distal non-contacting face opposite to its distal contacting face, and the second finger comprises a distal non-contacting face opposite to its distal contacting face, and the distal non-contacting face of the first finger and the distal non-contacting face of the second finger define an opening between the distal non-contacting face of the first finger and the distal non-contacting face of the second finger.

3. The friction hinge of claim 1, wherein the first finger and the second finger have a same shape.

4. The friction hinge of claim 3, wherein the first finger is rotated 180 degrees about its longitudinal axis relative to the second finger.

5. The friction hinge of claim 1, wherein the first stub biases the distal contacting face of the first finger in a first direction, and the second stub biases the distal contacting face of the second finger in a second direction opposite to the first direction.

6. The friction hinge of claim 1, wherein the first stub deflects the first finger toward the second finger, and the second stub deflects the second finger toward the first finger.

7. The friction hinge of claim 1, wherein the first stub deflects the first finger from a first pre-assembly position to a first post-assembly position that causes the distal contacting face of the first finger to exert an axial force in a second direction on the first biasing face of the first stub, and the second stub deflects the second finger from a second pre-assembly position to a second post-assembly position that causes the distal contacting face of the second finger to exert an axial force in a first direction opposite to the second direction on the second biasing face of the second stub.

8. The friction hinge of claim 1, wherein the first finger comprises a ramping surface between its distal contacting face and the finger substrate, wherein its ramping surface forms a ramp angle less than 90 degrees with respect to a longitudinal axis of the finger substrate.

9. The friction hinge of claim 8, wherein the distal contacting face of the first finger forms a contact angle less than the ramp angle with respect to the longitudinal axis of the finger substrate.

10. The friction hinge of claim 1, wherein the pin has a pin diameter that is smaller than the stub aperture in the first stub, the finger aperture in the first finger, the finger aperture in the second finger, and the stub aperture in the second stub.

11. The friction hinge of claim 1, further comprising:
a third stub extending from the stub substrate and adjacent to the first stub;
a third finger extending between the first stub and the third stub from the finger substrate, the third finger comprising a distal contacting face that is biased into contact with a second biasing face of the first stub; and
a fourth finger adjacent to and axially spaced from the third finger and extending between the first stub and the third stub from the finger substrate, the fourth finger comprising a distal contacting face that is biased into contact with a first biasing face of the third stub.

12. The friction hinge of claim 1, wherein the first stub and the second stub extend from a first side of the stub substrate, the friction hinge further comprising:

an opposing first stub and an adjacent opposing second stub extending from a second side of the stub substrate opposite to the first side;

an opposing first finger extending from an opposing finger substrate between the opposing first stub and the opposing second stub, the opposing first finger comprising an opposing distal contacting face that is biased into contact with an opposing first biasing face of the opposing first stub;

an opposing second finger adjacent to and axially spaced from the opposing first finger and extending from the opposing finger substrate between the opposing first stub and the opposing second stub, the opposing second finger comprising an opposing distal contacting face that is biased into contact with an opposing second biasing face of the opposing second stub; and an opposing pin extending through an opposing first stub aperture in the opposing first stub, an opposing first finger aperture in the opposing first finger, an opposing second finger aperture in the opposing second finger, and an opposing second stub aperture in the opposing second stub.

13. A method of operating a friction hinge comprising a stub substrate rotatably coupled to a finger substrate, the method comprising:
positioning the stub substrate at a first angular orientation relative to the finger substrate, wherein the stub substrate comprises a first stub and an adjacent second stub extending from a stub substrate, and the finger substrate comprises a first finger extending from the finger substrate between the first stub and the second stub, the first finger comprising a distal contacting face that is biased into contact with a first biasing face of the first stub, and the finger substrate comprising a second finger adjacent to and axially spaced from the first finger and extending from the finger substrate between the first stub and the second stub, the second finger comprising a distal contacting face that is biased into contact with a second biasing face of the second stub, wherein a pin extends through a stub aperture in the first stub, a finger aperture in the first finger, a finger aperture in the second finger, and a stub aperture in the second stub; and
repositioning the stub substrate to a second angular orientation relative to the finger substrate, wherein frictional contact between at least the distal contacting face of the first finger and the first biasing face of the first stub and between the distal contacting face of the second finger and the second biasing face of the second stub causes the stub substrate to maintain the second angular orientation relative to the finger substrate.

14. The method of claim 13, wherein the first finger comprises a distal non-contacting face opposite to its distal contacting face, and the second finger comprises a distal non-contacting face opposite to its distal contacting face, and the distal non-contacting face of the first finger and the distal non-contacting face of the second finger define an opening between the distal non-contacting face of the first finger and the distal non-contacting face of the second finger.

15. The method of claim 13, wherein the first finger and the second finger have a same shape.

16. The method of claim 15, wherein the first finger is rotated 180 degrees about its longitudinal axis relative to the second finger.

17. The method of claim 13, wherein the first stub biases the distal contacting face of the first finger in a first direction, and the second stub biases the distal contacting face of the second finger in a second direction opposite to the first direction.

18. The method of claim 13, wherein the first stub deflects the first finger toward the second finger, and the second stub deflects the second finger toward the first finger.

19. The method of claim 13, wherein the first stub deflects the first finger from a first pre-assembly position to a first post-assembly position that causes the distal contacting face of the first finger to exert an axial force in a second direction on the first biasing face of the first stub, and the second stub deflects the second finger from a second pre-assembly position to a second post-assembly position that causes the distal contacting face of the second finger to exert an axial force in a first direction opposite to the second direction on the second biasing face of the second stub.

20. A computing device, comprising:
 a first substrate;
 a second substrate moveably coupled to the first substrate via a friction hinge, the friction hinge comprising:
  a first stub and an adjacent second stub extending from a stub substrate;
  a first finger extending from a finger substrate between the first stub and the second stub, the first finger comprising a distal contacting face that is biased into contact with a first biasing face of the first stub;
  a second finger adjacent to and axially spaced from the first finger and extending from the finger substrate between the first stub and the second stub, the second finger comprising a distal contacting face that is biased into contact with a second biasing face of the second stub; and
  a pin extending through a stub aperture in the first stub, a finger aperture in the first finger, a finger aperture in the second finger, and a stub aperture in the second stub.

21. A method of assembling a friction hinge, the method comprising:
 providing a stub substrate comprising a first stub and an adjacent second stub extending from the stub substrate;
 providing a finger substrate comprising a first finger and an adjacent second finger extending from the finger substrate, the first finger comprising a distal contacting face and a ramping surface between its distal contacting face and the finger substrate, and the second finger comprising a distal contacting face and a ramping surface between its distal contacting face and the finger substrate;
 inserting the first stub at a base of the ramping surface of the first finger and the second stub at a base of the ramping surface of the second finger;
 sliding the first stub along the ramping surface of the first finger to its distal contacting face and the second stub along the ramping surface of the second finger to its distal contacting face, thereby biasing the first finger's distal contacting face against the first stub and the second finger's distal contacting face against the second stub;
 aligning a first stub aperture in the first stub, a first finger aperture in the first finger, a second finger aperture in the second finger, and a second stub aperture in the second stub; and
 inserting a pin through the first stub aperture, the first finger aperture, the second finger aperture, and the second stub aperture.

* * * * *